A. V. BURKE.
DRAFT EQUALIZER.
APPLICATION FILED MAY 25, 1908. RENEWED APR. 22, 1909.

Witnesses
L. B. James
M. T. Miller

Inventor
August V. Burke
By Chandler & Chandler
Attorneys

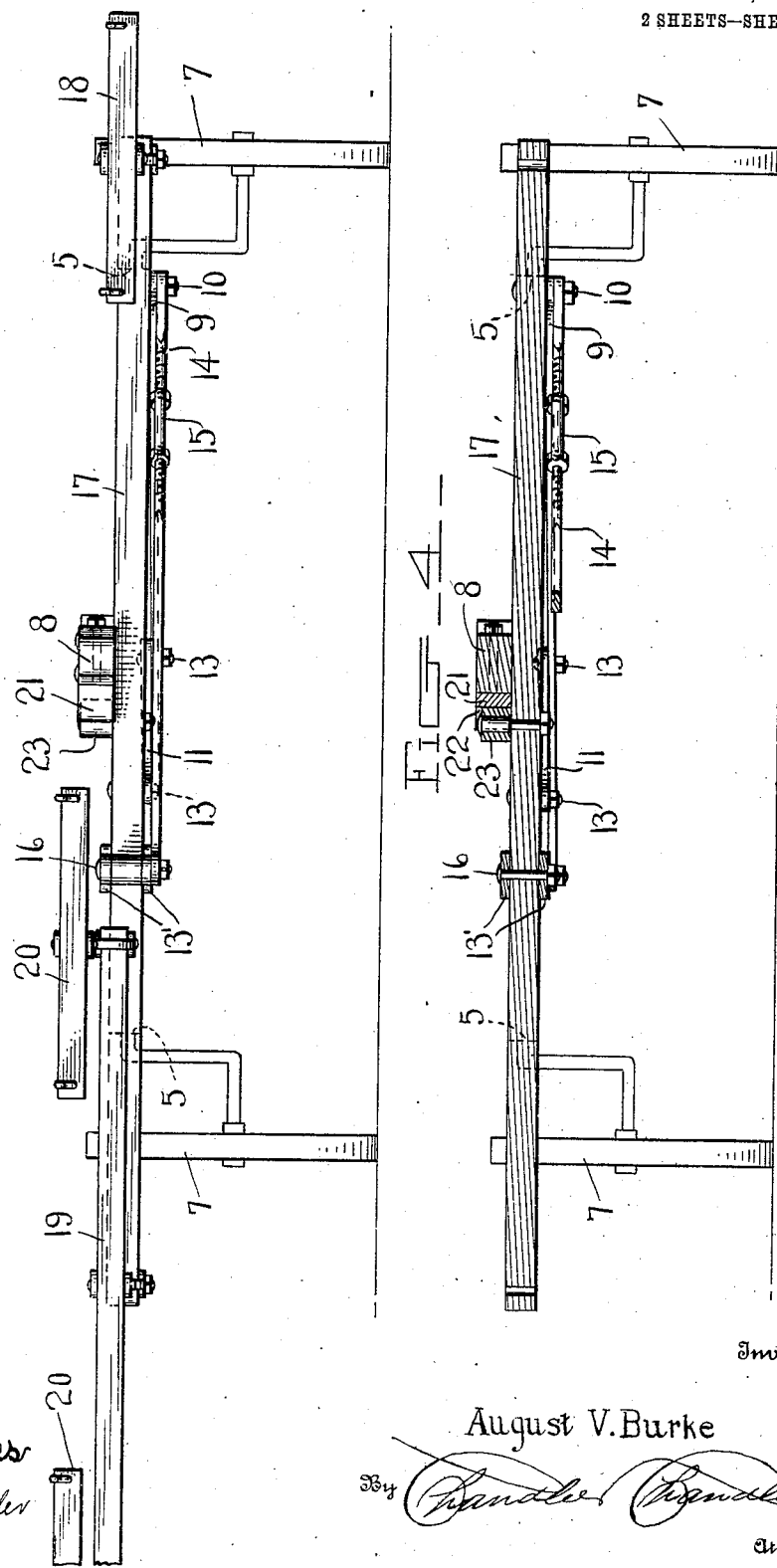

UNITED STATES PATENT OFFICE.

AUGUST V. BURKE, OF GREELEY CENTER, NEBRASKA.

DRAFT-EQUALIZER.

38,637. Specification of Letters Patent. Patented Nov. 2, 1909.

Application filed May 25, 1908, Serial No. 434,789. Renewed April 22, 1909. Serial No. 491,604.

*To all whom it may concern:*

Be it known that I, AUGUST V. BURKE, a citizen of the United States, residing at Greeley Center, in the county of Greeley, State of Nebraska, have invented certain new and useful Improvements in Draft-Equalizers; and I do hereby declare the following to be a full, clear, and exact description of the invention, such as will enable others skilled in the art to which it appertains to make and use the same.

This invention relates to draft equalizers, and more particularly to that class which is designed to be employed in connection with a cultivator or like implement and one of the primary objects of the invention is to provide a draft equalizer of such construction that it may be readily applied and adjusted to any ordinary form of implement of the class mentioned or of a similar type or class.

Another feature of the invention resides in the provision of means for relieving the device of strain to as great a degree as possible.

Broadly speaking, the device is in the nature of a frame which is adjustably but rigidly fixed upon the frame of the implement and upon the tongue thereof, a block upon the tongue provided with a concave side face, a draft bar pivoted upon the frame, and a roller carried by the draft bar and working against the said concave side face of the block.

Figure 1:
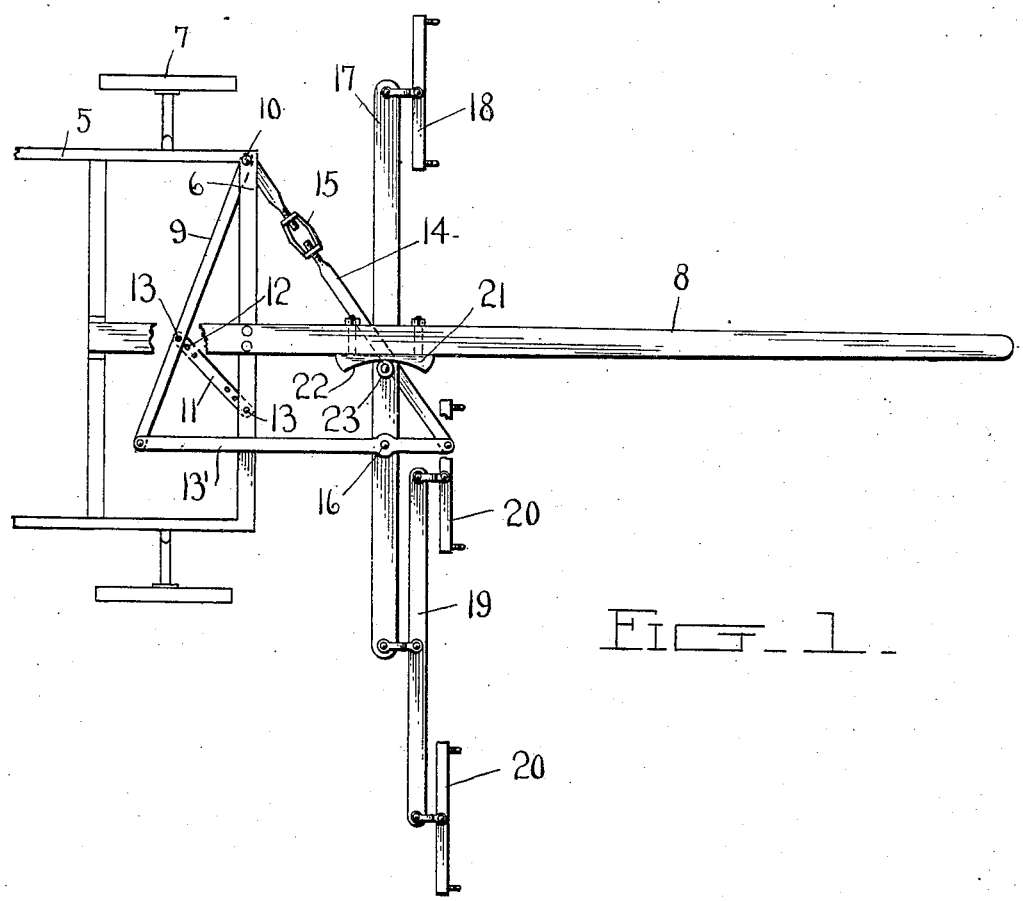
Figure 3:
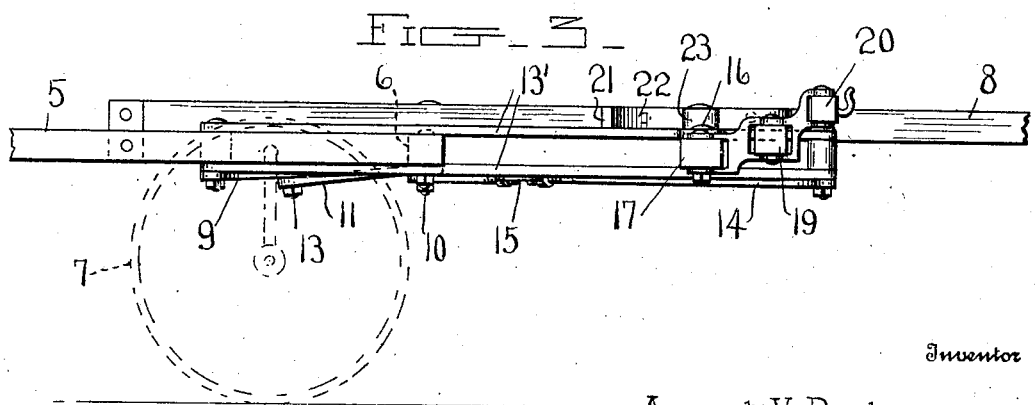

In the accompanying drawings, Figure 1 is a top plan view of the draft equalizer embodying my invention showing its application to the front end of an ordinary cultivator frame, the frame being shown in light lines, Fig. 2 is a front elevation thereof, Fig. 3 is a side elevation, and, Fig. 4 is a vertical transverse sectional view taken in a line with the line of extent of the draft bar.

In the drawings, the frame of the cultivator is shown as being made up of the usual side sills which are indicated by the numeral 5 and the front end cross sill which is indicated by the numeral 6, the said front end of the frame being supported by the usual wheels 7.

The tongue of the cultivator is indicated by the numeral 8 and as is clearly shown in the top plan view of the drawings, projects forwardly beyond the front end cross-sill 6 in the usual manner.

The frame of the draft equalizer embodying my invention is comprised of several bars which are connected to form a frame of triangular form and one of these bars, which is indicated by the numeral 9, is pivoted at one of its ends as at 10 to the left hand corner of the frame of the cultivator and extends diagonally rearwardly from the said corner and transversely of the frame, the said bar being braced with respect to the front end cross sill 6 of the cultivator frame by means of a brace 11 which is in the nature of a bar provided with a number of openings 12, adjacent each end, there being bolts 13 passed through the bar 9 and the front end cross sill 6 and interchangeably through the openings 12 so as to adjustably hold the bar 9 rigid with respect to the said front end cross sill 6.

Pivoted at its rear end to the rear or inner end of the bar 9 is a pair of bars 13' and these bars extend forwardly, one above and the other below the front end cross sill 6 and forwardly therebeyond and pivoted between the forward end of the said bars 13' is the forward end of a rod 14 the rear end of this rod being connected pivotally to the bolt which connects the outer end of the bar 9 with the left hand corner of the frame, there being preferably a turn buckle 15 interposed in the length of the rod 14 so that it may be adjusted as regards length, it being understood that adjustment of this bar as regards its length and adjustment of the bar 9 to extend at various angles with respect to the front end cross sill 6, adapt the frame for application to almost any ordinary form of cultivator frame and consequently renders the draft equalizer practically universal in its application.

Pivoted as at 16 to the bars 13' and extending beneath the tongue 8 of the cultivator is a draft bar 17, there being a swingle-tree 18 carried by the draft bar to one side of the tongue and a double-tree 19 carried by the draft bar to the other side of the tongue and there being also swingle-trees 20 carried by the said double-tree 19 at the ends thereof it being understood that in this manner, the draft connection for two horses to one side of the tongue and one horse to the other side of the tongue is provided for. A block 21 is rigidly secured upon the tongue at one side thereof and this block is formed with a concave side face 22 which is presented laterally from the tongue and against which works the roller 23 which is journaled upon the draft bar 17 at a predetermined distance from the pivot 16 of the said draft bar, it being understood that upon swinging of the draft bar upon its pivot this roller 23 will travel over the said concave face of the block.

From the foregoing description of my invention, it will be seen and understood that the frame of the equalizer is rigid with respect to the frame of the cultivator or other implements to which the equalizer is applied and that it may be adjusted with respect to the said frame and the tongue projecting therefrom so as to bring the roller 23 against the concave face of the block 21, any strain brought to bear upon the frame of the equalizer resulting in the said roller being forced more securely against the block, the strain being in this manner counteracted.

What is claimed is:

1. In a draft equalizer, the combination with a tongue and a support from which the tongue projects, of a frame fixed upon the support and tongue, a concave block fixed upon the tongue, a draft bar pivoted upon the frame, and a roller carried by the draft bar and working against the block.

2. In a draft equalizer, the combination with a tongue and a support from which the tongue projects, of a frame fixed upon the support and tongue, a draft bar pivoted upon the frame, a roller carried by the draft bar, and an element upon the tongue against which the roller works.

3. In a draft equalizer, the combination with a tongue and a support from which the tongue projects, of a frame fixed upon the support and tongue, a concave block fixed upon the tongue at one side thereof and having its concaved side presented laterally, a draft bar pivoted upon the frame, and a roller carried by the draft bar to one side of its pivot and working against the concave side face of the block.

4. In a draft equalizer, the combination with a tongue and a support from which the tongue projects, of a frame fixed upon the support and tongue, said frame comprising a bar pivoted at one end to one corner of the support and extending diagonally thereacross, a brace adjustably connecting the bar and the support, a bar pivoted to the other end of the first mentioned bar and extending forwardly beyond the support, adjustable connection between the said corner of the support and the extreme forward end of the last mentioned bar, a draft bar pivoted to the last mentioned bar, a block upon the tongue, and a roller journaled upon the draft bar and working against the block.

In testimony whereof, I affix my signature, in presence of two witnesses.

AUGUST V. BURKE.

Witnesses:
J. O. NELSON,
C. P. W. BURKE.